March 20, 1956 — H. P. BIRKEMEIER — 2,738,927
SNOW MELTING CONTROL Filed Jan. 13, 1953 — 7 Sheets-Sheet 1

Inventor.
Henry P. Birkemeier.
By John W. Darley
Attorney.

March 20, 1956 — H. P. BIRKEMEIER — 2,738,927
SNOW MELTING CONTROL
Filed Jan. 13, 1953 — 7 Sheets-Sheet 2

Inventor.
Henry P. Birkemeier
By John W Darley
Attorney.

March 20, 1956

H. P. BIRKEMEIER 2,738,927

SNOW MELTING CONTROL

Filed Jan. 13, 1953

Inventor.
Henry P. Birkemeier.
By. John W Darley
Attorney.

March 20, 1956 H. P. BIRKEMEIER 2,738,927
SNOW MELTING CONTROL
Filed Jan. 13, 1953 7 Sheets-Sheet 4

Inventor.
Henry P. Birkemeier
By John W. Darley
Attorney.

March 20, 1956 — H. P. BIRKEMEIER — 2,738,927
SNOW MELTING CONTROL
Filed Jan. 13, 1953 — 7 Sheets-Sheet 5

Inventor
Henry P. Birkemeier
By John W. Darley
Attorney

March 20, 1956  H. P. BIRKEMEIER  2,738,927
SNOW MELTING CONTROL

Filed Jan. 13, 1953  7 Sheets-Sheet 6

Inventor.
Henry P. Birkemeier.
By John M Darley
Attorney.

March 20, 1956     H. P. BIRKEMEIER     2,738,927
SNOW MELTING CONTROL Filed Jan. 13, 1953     7 Sheets-Sheet 7

Inventor.
Henry P. Birkemeier.
By John M. Darley
Attorney.

United States Patent Office 2,738,927
Patented Mar. 20, 1956

2,738,927

SNOW MELTING CONTROL

Henry P. Birkemeier, Chicago, Ill., assignor to Bell & Gossett Company, Morton Grove, Ill., a corporation of Illinois Application January 13, 1953, Serial No. 331,092

26 Claims. (Cl. 237—1)

My invention relates to snow melting controls for determining the operation of melting equipment.

In regions which are subjected to severe winter weather, it is desirable to avoid the laborious and expensive hand or machine removal of snow from pavements, driveways and side walks in general by embedding piping in these structures and pumping a heated, non-freezing fluid through the piping. With such melting systems, best results dictate the use of an automatic control because it is important to set the melting system in operation as soon as possible after the snow begins falling and the latter frequently occurs during the night. If the system is manually controlled and not under constant supervision, a night snow fall might so clog the walks as to place a severe and perhaps impossible load on the melting system.

It is therefore one object of my invention to provide a control that is automatically responsive to snow fall for determining the pumping of a heating fluid through a panel heating system embedded in a paved way.

A further object is to provide a control of the character indicated which when once conditioned for operation, as by closing a main switch in an electrical circuit, automatically institutes the working of the panel heating system when snow begins to fall and automatically interrupts the operation of the heating system soon after the snow fall ceases.

These and further objects of the invention will be set forth in the following specification, reference being had to the accompanying drawings, and the novel means by which said objects are effectuated will be definitely pointed out in the claims.

In the drawings:

Fig. 2 is an enlarged, sectional elevation, partly diagrammatic, of the control shown in Fig. 1.

Figures 1, 4, 5, 6:
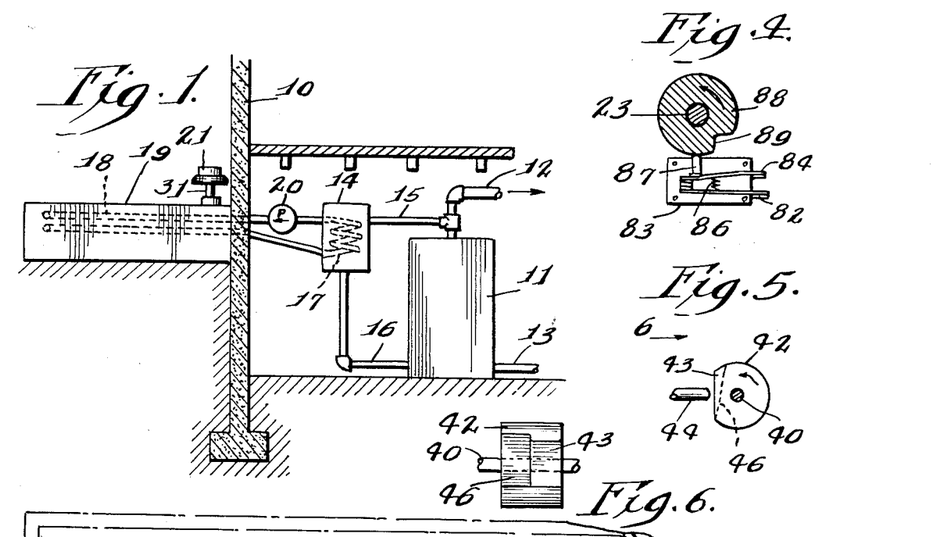
Fig. 1 is a diagrammatic, sectional elevation of a residence installation showing the panel heating system for an adjacent driveway and its heat exchange relation to the usual heating system for the residence.
Figs. 4 and 5 are sections along the lines 4—4 and 5—5, respectively, in Fig. 2 showing certain cam and switch relations.
Fig. 6 is a view of the cam shown in Fig. 5 looking in the direction of the arrow 6.

Referring to Fig. 1, there is illustrated, by way of example, an arrangement in which the control regulates a snow melting, panel system that is associated with the heating system for a building. Specifically, the numeral 10 designates a building which is heated by a hot water boiler 11 that is connected to the usual radiating devices (not shown) by supply and return pipes 12 and 13, respectively. A tank 14 is connected by pipes 15 and 16 to the boiler to provide a local, thermogravitational circuit through which boiler water constantly flows. Immersed in the water in the tank 14 is a coil 17 which is connected to a pipe circuit 18 of the panel type whose principal portion is embedded in a driveway or pavement 19. The embedded part of the panel system 18 may be arranged in any desired manner to secure an appropriate transfer of heat to the driveway and included in this system is a motor driven pump 20 whose operation is determined by a control 21 that is located in an exposed position and is responsive to snow fall.

From the foregoing, it will be understood that the tank 14 and coil 17 from a heat exchanger whereby heat from the boiler is transferred to a non-freezing liquid in the system 18. This arrangement is suggestive only since heating units other than hot water boilers may be employed and it is immaterial how heat is supplied to the panel heating system 18.

The control 21 and the allied electric circuits are more particularly illustrated in Fig. 2 to which reference will now be made. The numeral 22 designates an electric clock motor which it will be assumed rotates at the rate of two revolutions per hour and whose output shaft 23 connects with a bevel pinion 24 that meshes with a bevel gear 25. This gear is fast on a vertical shaft 26 that is journaled in a bushing 27 which, together with the horizontal portion 28 of an inverted U-bracket 29, are clamped to the under side of a dome-shaped cover 30 that is supported on the driveway 19 by a suitable standard 31 (see Fig. 1). One depending arm 32 of the bracket 29 serves as a support for the motor 22 and pinion 24.

The shaft 26 extends above the dome cover 30 for securement to a horizontal, snow collecting, disk table 33, formed of metal or of some heat conducting material, which is exposed so that snow may fall thereon and whose upper surface includes a plurality of flat top, radial ridges 34 for a purpose presently explained. Also secured to the upper end of the shaft 26 is a paddle 35 having a plurality of equispaced, radial and vertical vanes 36, four such being shown, which extend upwardly from the table 33. As viewed in Fig. 3, the table 33 rotates in a clockwise direction.

The paddle 35 rotates with the table 33 and actuates the free end of a rock arm 37 that carries a depending blade 38 whose lower edge is spaced from the upper surfaces of the ridges 34 a distance sufficient to provide free working clearance with the top of the table 33. Preferably, the blade 38 extends along the rock arm 37 from the free end thereof and, adjacent the periphery of the table 33 when the rock arm is in the position shown in Fig. 3, the blade 38 curves away from the rock arm and extends beyond the edge of the table. This arrangement improves the snow gathering action of the blade. The other end of the arm 37 is secured to the upper end of a vertical, rock shaft 40 which extends downwardly through and is journaled in a bushing 41 carried by the cover 30. The lower end of the rock shaft 40 carries a cam 42 having a face 43 located in actuating relation to a plunger 44 forming part of an electric switch 45 and a face 46 located in actuating relation to a plunger 47 forming part of an electric switch 48. The cam 42 is cylindrical for the most part and the faces 43 and 46 are flat. The relative arrangement of these faces is such that the switch 45 is closed first in response to a determined swing of the rock arm 37 and the switch 48 is closed thereafter in response to a greater swing of the rock arm, all as presently described.

Preferably, the switches 45 and 48 are of the snap acting type which automatically open when the force which closes them is removed, the force in the present instance being the camming actuation of the plungers 44 and 47. A suitable switch for this purpose is disclosed in United States Letters Patent No. 1,960,020, dated May 22, 1934.

For convenience, the switches 45 and 48 are shown in juxtaposed position and both are carried by a horizontal arm 49 forming part of the bracket 29. The rock arm 37 is biased into contact with the vanes of the paddle 35 by a spring 50 whose ends are respectively connected to a post 51 carried by the switch 48 and a post 52 carried by a collar 53 that is secured to the rock shaft 40 below the cam 42.

Auxiliary features, mechanically speaking, include an annular wall 54 which extends upwardly from the cover 30 in enclosing relation to the table 33 and rock arm 37, and a screen or grid 55 which bridges the upper and open end of the wall 54 and whose mesh is sufficiently coarse to permit a substantially free fall of snow therethrough. The wall 54 prevents wind from blowing snow off the table 33 and also from moving the rock arm 37 to a false position, i. e., one not determined by the accumulation of snow on the table, while the screen 55 shields the table from leaves and other debris. An inverted, dished shield 56 is carried by the shaft 40 above and with its outer edge extending beyond the upper end of the bushing 41 to prevent rain from leaking downwardly along the shaft 40 and whose freezing would lock this shaft against movement. Drain openings 57 are provided in the wall 54 adjacent its junction with the cover 30 to discharge rain water and melted snow from the table 33, this melting being achieved in the manner presently described.

The electrical circuits employed in the control are diagrammatically shown in Fig. 2 and in which the numerals 58 and 59 designate power wires, the former wire being hot and connecting through a main switch 60 and wire 61 with the motor 22 and a wire 62 connects the motor with the power ground wire 59. Accordingly, when the switch 60 is closed, the motor 22 drives the table 33 at a slow speed of rotation. A wire 63 connects the wire 61 with a terminal 64 forming part of the switch 45 and the other terminal 65 connects by a wire 66 with a relay coil 67 which in turn connects by a wire 68 with the power wire 59. Hence, when the switch 45 is closed, as presently described and assuming a closure of the switch 60, the relay coil 67 is energized.

The core 69, associated with the coil 67, is carried by the bracket arm 49 and pivotally mounted on a wing 70 depending from this arm is an armature 71 that is operatively related to the core 69. The armature 71 is biased to a position clear of the relay core 69 by a spring 72 whose ends are respectively connected with one end of the armature and a post 73 mounted on the wing 70.

Depending from the other end of the armature 71 is an insulation rod 74 which is connected to the free ends of springy switch arms 75 and 76 which are related, respectively, to contacts 77 and 78. The switch arms 75 and 76 and the contacts 77 and 78 are suitably insulated from each other and are carried by an extension 79 of the wing 70.

The switch arm 75 connects by a wire 80 with the wire 61 and hence with the power wire 58 while the contact 77 connects by a wire 81 with one terminal 82 of a switch 83 whose other terminal 84 connects by a wire 85 with the wire 66 and hence with the relay coil 67. For convenience, the switch 83 (see Fig. 4) is illustrated as a simple blade type with its contact elements biased towards separation by a spring 86 which is suitably insulated. Preferably, however, the switch 83 is snap acting and generally of the same type as the switches 45 and 48.

The actuating element for the switch 83 is a plunger 87 whose exposed end bears constantly against the periphery of a cylindrical cam 88 (see Figs. 2 and 4) that is coaxial with and secured to the shaft 23 between the bracket arm 32 and pinion 24. The working surface of the cam 88 includes a depression 89 in which the plunger 87 dwells for a short time once during each revolution of the cam and which enables the switch 83 to open for a purpose presently explained. Therefore, at the assumed rotative speed of the motor of two revolutions per hour, the switch 83 will be opened every half hour for short periods but for the greater part of the half hour cycle, the switch will be closed.

The switch arm 76 and the contact 78 control an independent load circuit which includes a power wire 90 connected to the contact 78 while the switch arm 76 connects through a wire 91 and motor 92 with a power wire 93. The motor 92 is drivably connected to the pump 20 so that when the switch arm 76 is closed, the pump circulates the heated liquid through the embedded panel system 18 (see Fig. 1).

Another auxiliary circuit whose closure is tied in with the snow fall is an arrangement for applying heat to the snow laden table 33 to melt the snow thereon at a determined rate. Referring to Fig. 2, the wire 63 connects with one terminal 94 of the switch 48 and the other terminal 95 connects with an adjustable heater 97 positioned close to the under side of the cover 30 and this heater connects by a wire 98 with the wire 68 and hence with the power ground wire 59. An opening 99 is provided in the cover 30 above the heater 97 so that heated air rising from the latter is applied against the table 33.

In describing the operation of the control, it will be assumed that the switch 60 is manually closed at the beginning of and remains closed during the snow season. The table 33 then rotates constantly during this period, but the power consumption is small due to the low speed and small size of the motor. An alternative arrangement would consist in a substitution for the manual switch 60 of a thermostatic switch which is responsive to outdoor temperature and adjusted to open when such temperature was above that permitting snow fall. With a thermostatic switch, operation of the table becomes automatic but makes no change in the intended operation of the control so that the above switches are regarded as equivalents. A further alternative is to close the manual switch 60 when snow begins falling, but this method is not recommended for snow frequently begins during the night when it may not be observed by the householder, for example, and it is important that the melting panel 18 become operative as soon as possible after the snow fall commences.

Generally speaking, the control operates on the principle of employing an accumulating mass of snow, collected by a shovel-like action between the relatively movable table 33 and blade 38, as a means for closing the switches 45, 48 and 83 and energizing the associated circuits.

With the table 33 rotating and snow not falling, the rock arm 37 is subjected to to and fro movements under the impulses of the vanes 36 and the contrary pull of the spring 50. Assuming a clockwise rotation of the table 33, as viewed in Fig. 3, the paddle movements of the rock arm 37 cause counterclockwise movements of the cam 42, as viewed in Fig. 5, but such movements of the rock arm do not rotate the cam 42 sufficiently to actuate the switch 45.

When snow begins falling, it accumulates on the table 33 and after it reaches a sufficient depth, the wiping movement of the blade 38 begins building a mass of snow on the collecting side of the blade. This accumulating snow mass is carried primarily by the table 33 and as it increases in size, the rock arm 37 is moved by the pressure of the mass in a counterclockwise direction, as viewed in Fig. 3, until it reaches, by way of example, the dotted position shown in the latter figure. The cam then closes the switch 45 to thereby render operative the circuit including the relay coil 67 whose energization moves the armature 71 upwardly (see Fig. 2) and closes the switch arms 75 and 76. The closure of the switch arm 76 energizes the independent load circuit including the motor 92 so that the pump 20 begins circulating heated liquid through the panel system 18 to melt snow on the driveway 19.

The closure of the switch arm 75 energizes the circuit including the switch 83, since in the position of parts shown in Figs. 2 and 4, the plunger 87 for this switch rides on the cylindrical portion of the cam 88 so that the switch 83 is closed. Further, the last named circuit also includes the relay coil 67 and is to be regarded as a holding circuit for this coil for reasons presently explained.

The control having been conditioned as described above to establish a heat flow through the panel system 18, it is necessary to establish a comparable melting rate for the snow on the table 33 so as to insure a stopping of the control when snowing ceases. This result is attained through the circuit including the switch 48 and adjustable heater 97 whose heat is applied to the table and which is preferably adjusted to maintain approximately the same melting rate on the table as is exercised on the driveway 19 by the panel system 18. The closing of the switch 48 by the cam face 46 requires a slight movement of the rock arm 37 by the accumulated snow mass beyond the dotted position shown in Fig. 3, the cam face 43 maintaining closure of the switch 45.

Figure 3:
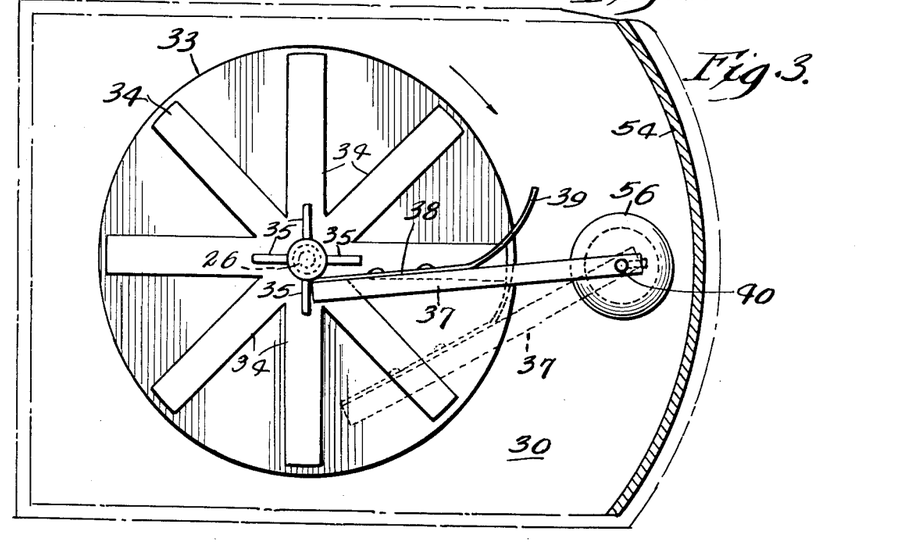
Fig. 3 is a fragmentary plan view of the control looking in the direction of the arrow 3 in Fig. 2.
Figure 4:
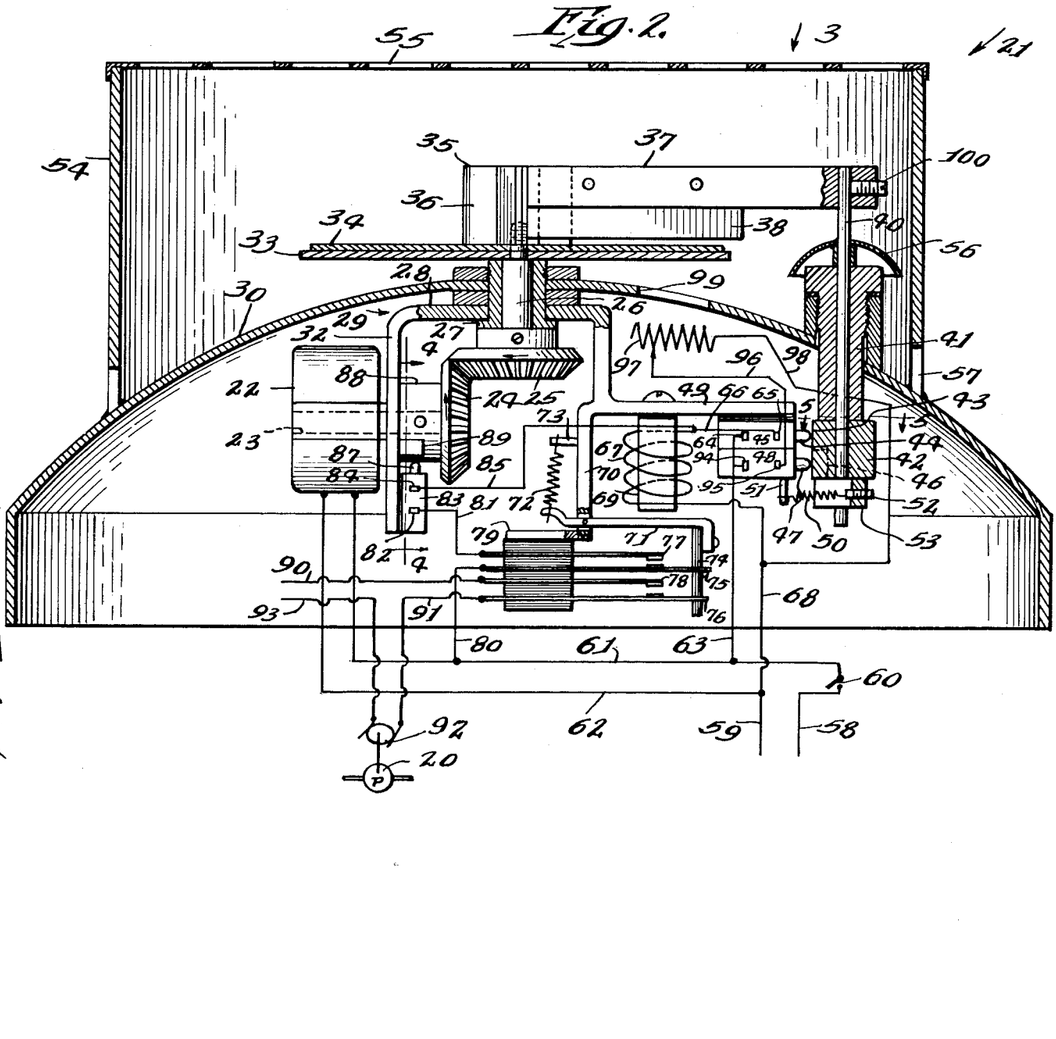

With the switches 45, 48 and 83 closed as above stated, snow is melted on the driveway 19 as long as snow continues to fall, or otherwise expressed, as long as the rock arm 37 is maintained in at least the dotted position shown in Fig. 3. When the snow fall ceases, melting of the snow on the table 33, due to the heater 97, continues until the accumulated snow mass has diminished enough to permit the spring 50 to move the rock arm 37 inwardly an angular distance sufficient to enable the switch 48 to open, thus rendering the heater 97 inoperative.

However, an additional source of heat is provided by the motor 22 which is also applied to the table 33 through the opening 99 and is sufficient, in the absence of snow fall, to melt enough snow on the table to permit the rock arm 37 to return to the position in which it can be actuated by the vanes 36. In this position of the arm 37, the switch 45 is open and the relay coil 67 would be deenergized but for the action of the holding circuit which includes this coil and the switch 83.

After the coil 67 has been initially energized by the closing of the switch 45 to thereby close the switch arms 75 and 76, if it should happen, due to the nature of the snow or changes in the rate of snow fall, that the snow on the table 33 was melted too rapidly, the switch 45 would be opened and the coil 67 would be deenergized with consequent interruption of the heat supply to the panel system 18. The switch 83, being in series with the relay coil 67, exercises a time delay on the deenergization of this coil to permit continued operation of the panel system 18 so long as the switch plunger 87 rides on the cylindrical surface of the cam 88, the length of the delay being determined by the circumferential distance of the depression 89 from the plunger 87 when the switch 45 opens. Generally speaking, this delay will insure clearing of the pavement 19 and when the plunger 87 seats in the depression 89, the coil 67 is deenergized and the control ceases to function until a new snow mass is accumulated on the table 33.

In addition to the time delay on the deenergization of the relay coil 67, the control is characterized by a number of other important features. The ridges 34 provide a series of radial abutments for the snow as it is deposited on the table 33 and subjected to the wiping action of the blade 38, thus preventing slipping of the snow on the table due to the impulses of the blade. Further, the to and fro movements of the blade 38, as induced by the vanes 36 and spring 50 with respect to the rotation of the table 33, insures an accelerated shovel-like action in gathering the minimum snow mass which is essential to the operation of the control. This arrangement is particularly important for quick response to a light snow fall for it is a requisite that the panel system 18 be placed in operation as soon as possible after the snow fall commences. The vane actuation of the rock arm 37 is also useful in taking up the slack of the switches 45 and 48 if of the snap acting type.

The time when the blade 38 begins to collect snow on the table 33 may be varied by adjusting the vertical position of the blade relative to the table through the medium of a set screw 100 carried by the rock arm 37 and which engages the shaft 40.

Figures 7, 8:
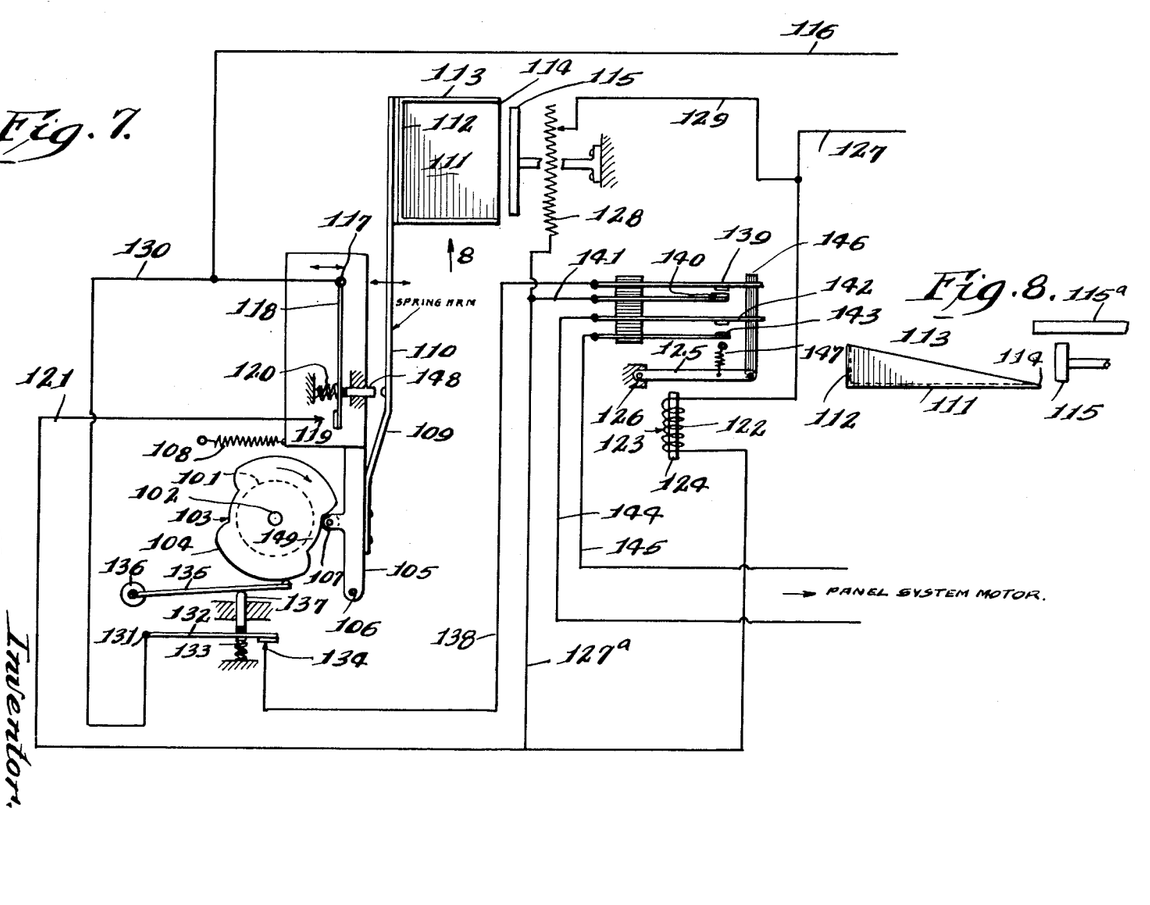
Fig. 7 is a schematic view of a modified form of the control, the snow gathering elements thereof being shown in plan view.
Fig. 8 is a side view of the snow gathering elements looking in the direction of the arrow 8 in Fig. 7.

In Fig. 7 is shown diagrammatically a modified form of the control which also utilizes an accumulated snow mass as a means of triggering the control, but gathers this mass on members having straight, relatively reciprocating or oscillating movements.

The numeral 101 designates a clock type motor, similar to the motor 22, whose output shaft 102 rotates one revolution in each hour. Secured to this shaft is a cam 103 having a pair of diametrically opposed lobes 104—104. A rock arm 105 is pivoted at 106 and carries a roller 107 which rides on the periphery of the cam 103 and is biased into contact therewith by a spring 108. One end of a spring arm 109 is secured to the rock arm 105 adjacent the pivot thereof and the remainder of the spring arm 109 is offset as at 110 from the rock arm 105 and carries on its free end a snow collecting table 111 which, as indicated in Fig. 8, possesses a shovel-like shape including an end wall 112 which serves as the abutment part of the table and side walls 113 which taper from the end wall to the leading edge 114 of the table.

From the foregoing, it will be apparent that, so far as described, the table 111 will be rocked toward the right by the cam 103 twice in each hour and between actuations of the roller 107 by the lobes 104, the table 111 will be returned to the position shown by the spring 108. Adjacent the leading edge 114 is a fixed blade 115 having a length slightly less than the width of and whose lower face slightly clears the table when the latter is moved towards the blade. It will be understood that the mechanical parts of the control are generally horizontally disposed so that the table 111 faces upwardly to receive snow fall in the same manner as the rotary table 33. The electrical portion of the control includes a hot power wire 116 which connects with the pivoted terminal 117 of a switch 118 that is carried by the rock arm 105 and which is normally biased free of the switch contact 119 by a spring 120. This showing of the switch 118 is intended to be diagrammatic only and as indicating a switch which automatically opens when the closing force is removed. A snap switch of the type disclosed in the above noted patent may be employed.

The terminal 119 connects by a wire 121 with one end of a coil 122 forming part of a relay 123 which additionally includes a core 124 and an armature 125 pivoted at 126. The other end of the coil 122 connects with the power ground wire 127. The circuit just described will, when closed under conditions presently described, energize the relay coil 122 and attract the armature 125.

Tied in with this circuit in parallel with the coil 122 is a circuit including a wire 127ª that connects the wire 121 with an adjustable heater 128 which in turn connects by a wire 129 with the power wire 127.

The control also includes a time delay holding circuit for the same reason as indicated for the control shown in Fig. 2, the switch for this circuit being actuated by the cam 103. Specifically, a wire 130 connects the power wire 116 with the pivoted terminal 131 of a switch 132 which is biased by a spring 133 to stand free of the switch contact 134 when the spring is able to act. For actuating the switch 132 to the closed position shown, a follower arm 135 is pivoted at one end 136 and its opposite end rides on the periphery of the cam 103. An intermediate portion of the arm 135 constantly bears against one end of an insulated plunger 137 whose opposite end bears against the switch 132. Hence, whenever the arm 135 rides on the lobes 104, the switch 132 is closed and the latter is open during intervening periods. The same comments apply to the switch 132 as were expressed in connection with the switch 118 with respect to employing a switch of the snap acting type. The switch contact 134 connects by a wire 138 with a springy switch arm 139 operably related to a contact 140 that connects by a wire 141 with the wire 127.

The control also includes an independent load circuit comprising a springy switch arm 142 operably related to a contact 143, the arm and contact being respectively connected by wires 144 and 145 to a power circuit including the pump motor 92 as described for the Fig. 2 modification. The switch arms 139 and 142 are tied together for simultaneous movement by connection to an insulation rod 146, one end of which is attached to the free end of the armature 125. When the relay coil 122 is energized, the switch arms 139 and 142 are moved to closed positions and when the coil is deenergized, a spring 147 attached to the armature returns the arms 139 and 142 to open positions.

In describing the operation of the Fig. 7 modification, it will be assumed that the parts are in the positions shown, that the motor 101 forms part of a power circuit including the switch 60 (see Fig. 2) which is closed and which switch also closes the main circuit including the power wires 116 and 127, all in the comparable manner shown in Fig. 2, and that snow is not falling.

Therefore, twice in each hour, the arm 105 will be rocked by the cam 103 towards the right, as viewed in Fig. 7, to move the table 111 in the same direction and effect a wiping movement of the blade 115 with respect to the surface of the table. During this operation, the offset portion 110 of the spring arm 109 maintains the relation to the rock arm 105 as shown in Fig. 7, since there is no resistance offered to the movement of the table. Further, the circuits including the relay coil 122 and heater 128 are open because the switch 118 is open and while the switch 132 is closed in the position shown, the circuit including this switch is open because the switch arm 139 is open due to the deenergized condition of the coil 122.

When snow begins falling, each traverse of the table 111 relative to the blade 115 banks snow on the table against the end wall 112 and eventually the resistance thus offered to the movement of the table towards the blade, which may be regarded as a forward movement, results in a bending or bowing of the spring arm 109 towards the rock arm 105. When the spring arm 109 bows sufficiently, it actuates a plunger 148 which closes the switch 118, thus completing the circuit through the heater 128 which begins applying heat to the snow on the table 111 and also completing the circuit through the coil 122 which is energized to attract the armature 125 and thus close the switch arms 139 and 142. The closing of the latter arm completes the load circuit so that the pump 20 (see Fig. 2) begins circulating heated liquid through the panel system 18.

For the sake of clearness, the heater 128 is positioned as shown, but it will be understood that this coil will be located to exercise the best heating effect on the table, a suggested location for this coil being beneath the table as in Fig. 2. Further, and for the same reasons as expressed for the Fig. 2 control, the heater 128 is adjusted to establish about the same melting rate on the table 111 as is exercised by the panel system 18.

As indicated in Fig. 7, each cam lobe 104 extends for about one quadrant of the cam 103 so that each forward movement of the table 111 is maintained for about fifteen minutes, with a like closure period of the switch 118 provided that there is sufficient snow banked on the table. Also, it will be observed that, assuming a clockwise rotation of the cam 103, and in the position of parts illustrated, when the upper lobe 104 is about to move the rock arm 105 to a forward position of the table, the lower cam lobe 104 is near the end of its actuating pressure on the free end of the follower arm 135. In other words, there are times when the closing of the switch 132 and the forward movements of the table 111 are coincident, and there are other times when only the switch 132 may be closed while the switch 118 may be open if sufficient snow is not banked on the table.

When the switch 118 closes for reasons noted, the coil 122 is energized and the heater 128 is placed in operation, but if due to too rapid melting of snow on the table 111, regardless of the position of the rock arm 105, the switch 118 is opened, the maintenance of closure of the switch 132 by the cam 103 will continue energization of the coil 122 to thereby maintain operation of the heater 128 and closure of the load circuit until the free end of the follower arm 135 rides in one of the dwell portions 149 of the cam when the control shuts down. The same operation occurs when snow stops falling. If desired, a cover 115ª may be located above the fixed blade 115 to prevent snow falling on the table 111 when in the advanced position.

Figure 9:
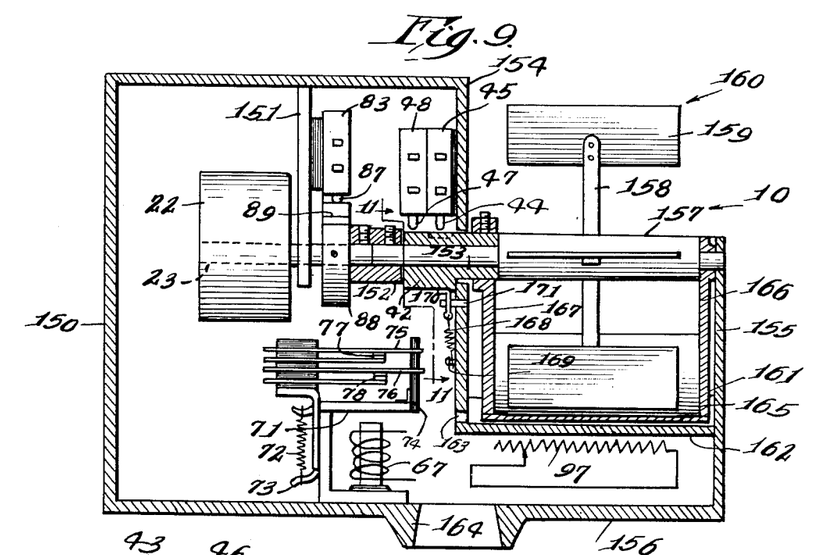
Fig. 9 is a sectional elevation of a further modification showing generally only the mechanical parts since the electrical circuits are identical with those shown in Fig. 2.
Figures 10, 11:
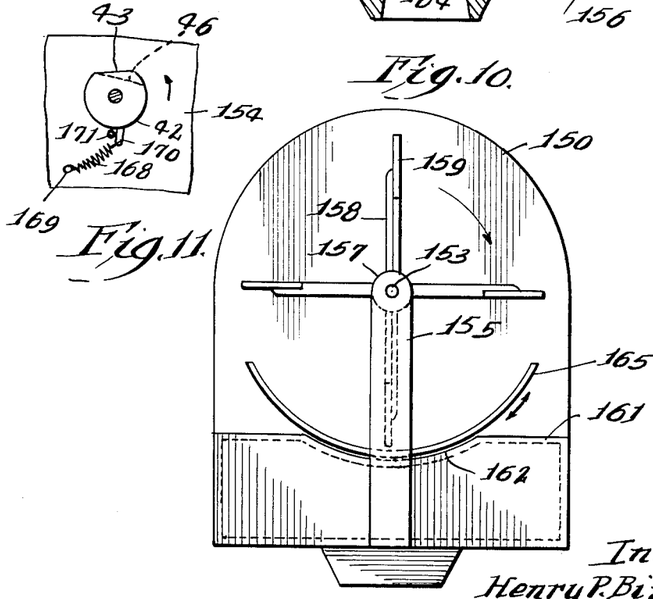
Fig. 10 is an end view looking in the direction of the arrow 10 in Fig. 9.
Fig. 11 is a detail section along the line 11—11 in Fig. 9.

In Figs. 9 to 11 is illustrated a further modification in which the electric circuits, motor, switches and cams are functionally identical with the similar parts shown in Fig. 2, and the only essential difference resides in the manner of accumulating a snow mass for energizing the several circuits. Accordingly, the motor, switches and cams are identified by the same numerals as the comparable parts in Fig. 2 and reference may be had to the latter figure for the associated circuits.

Referring to Fig. 9, the numeral 150 designates a suitable housing having an internal, depending wall 151 through which the motor shaft 23 extends and is journaled therein. The cylindrical cam 88 is secured to the shaft 23 in operative relation to the plunger 87 of the switch 83 and the output end of the shaft is attached to a coupling member 152 which is also secured to a horizontal, paddle shaft 153 that extends outwardly of the end wall 154 of the housing and is journaled in a standard 155 extending upwardly from the floor 156 of the housing and suitably spaced from the wall 154.

A hub 157 is keyed to the shaft 153, or this hub may constitute an enlargement of the shaft, and radiating therefrom is a plurality of arms 158 each carrying a horizontal blade 159, this subassembly forming a paddle wheel 160 which is driven by the motor 22.

The wall 154 terminates short of the floor 156 and connects with the standard 155 by a generally horizontal web 161 which may include a central arcuate portion 162 having a drain aperture 163 whose discharge and other snow meltings, including rain water, are evacuated through a main discharge opening 164 in the floor 156.

In this modification, the snow collecting table 165 is arcuate in shape, being concave upwardly, and it is bridged between hangers 166 and 167, the former being freely journaled on the paddle shaft 153 between the hub 157 and standard 155 while the hanger 167 is secured to the cam 42. This cam is also freely journaled on the shaft 15 in the same operative relation to the plungers 44 and 47 of the switches 45 and 48, respectively, as discussed in connection with Fig. 2.

The Fig. 9 control also includes the switch arms 75 and 76 and the corresponding contacts 77 and 78, respectively, which are engaged by the energization of the relay coil 67 that rocks the armature 71. Beneath the web 161 which is composed of heat conducting material is located the heating coil 97. All of the electrical parts of this form of the control are associated in the same manner as shown in Fig. 2.

When snow begins falling, and considering the slow revolution of the paddle shaft 153 in a clockwise direction as viewed in Fig. 10, two revolutions per hour, the rotative resistance exerted against the blades 159 by the snow collected on the table 165 causes the latter to rock in the same direction. The cam 42 is accordingly rocked to first close the switch 45 and energize the relay coil 67 with accompanying closures of the switch arms 75 and 76 and thereafter to close the switch 48 to complete the circuit through the heater 97, all as described for Fig. 2. The switch 83 exercises the same holding control on the relay coil 67 as discussed for Fig. 2.

The rocking movement of the table 165 is exercised against the pull of a spring 168 whose ends are respectively attached to a post 169 on the wall 154 and a post 170 fastened to the cam 42. When the snow fall ceases, the spring 168 returns the table 165 to the position shown in Fig. 10 in which the post 170 engages a stop pin 171 projecting from the wall 154.

Figures 12, 13, 14:
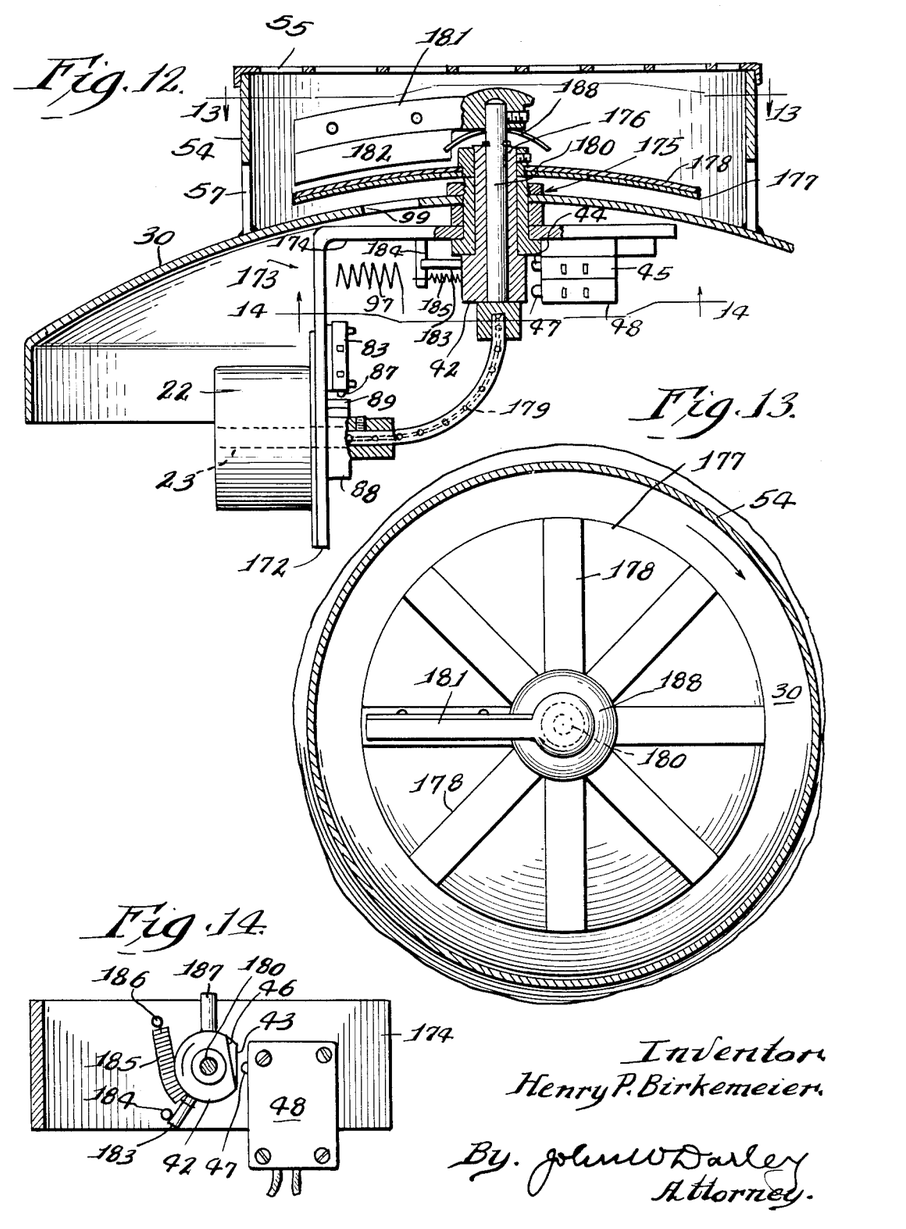
Fig. 12 is a sectional elevation of a further modification showing the mechanical arrangement thereof, the electric circuits being the same as in Fig. 2.
Figs. 13 and 14 are sections along the lines 13—13 and 14—14, respectively, in Fig. 12.

In Figs. 12 to 14 is illustrated a further modification in which the snow collecting table oscillates and the blade rotates, being to this extent a variation of the arrangement shown in Fig. 9, but differs therefrom in that the blade shaft is vertical. The electrical circuits are the same as those shown in Fig. 2 and only the cam-switch relationships are illustrated in Fig. 12. Since these cams and switches are functionally identical with their counterparts in Fig. 2, they are designated by the same numerals.

Referring to Fig. 12, the motor 22 is carried by the depending arm 172 of a bracket 173 having a horizontal arm 174 that is suspended by means of a bushing-nut structure 175 that extends part way through the dome cover 30 and is coaxial therewith. As in Fig. 2, the annular wall 54 extends upwardly from the cover 30 with drain openings 57 and the upper end of the wall 54 is bridged by the screen 55.

Freely journaled in the bushing of the structure 175 is a rock sleeve 176 whose lower end beneath the arm 174 carries the cam 42 having faces 43 and 46 operably related to the switches 45 and 48, all as discussed above. The upper end of the sleeve 176 carries a snow collecting, disk table 177 which, for convenience, is shown as dished to conform to the table, but may be flat. Flat top, radial ridges 178, similar to the ridges 34, are provided on the upper surface of the table 177.

The motor shaft 23 has secured thereto the cam 88 having the depression 89 and related to the switch 83. A flexible shaft 179 connects the motor shaft 23 with a shaft 180 that extends upwardly through the cam 42 and sleeve 176 and is journaled therein. The upper end of the shaft 180 carries a radial arm 181 from which depends a blade 182 that rotates continuously above the table 177 when the switch 60 (see Fig. 2) is closed.

As before stated, the switches 45, 48 and 83 form part of electric circuits as shown in detail in Fig. 2, including the adjustable heater 97 which is located beneath the opening 99 in the cover 30, and those circuit parts not illustrated in Fig. 12 including the relay coil 67, switch arms 75 and 76 and the armature 71 connected, and the load circuit including the pump motor 92.

In the operation of this modification, snow deposited on the table 177 is wiped over by the blade 182, rotating clockwise as viewed in Fig. 13, banking the same against the ridges 178 until sufficient resistance between the table and blade is established to rock the cam 42 in the same direction. As in Fig. 2, this movement of the cam 42 first closes the relay coil circuit through the switch 45 and thereafter closes the switch 48 and hence the circuit through the heater 97. Energization of the relay coil 67 closes the switch arms 75 and 76 and the operation is otherwise the same as described for Fig. 2 including the holding action of the circuit having as a part thereof the switch 83.

The Fig. 12 modification is somewhat simpler in a mechanical sense than that shown in Fig. 2 because the telescoped relation of the blade shaft 180 and the cam sleeve 176 enables these parts to be mounted on a common axis.

When snow is not falling, the table 177 is held stationary through the medium of a post 183 (see Fig. 14) projecting from the cam 42 and which contacts a stop 184, depending from the arm 174, under the pull of a spring 185 whose opposite ends are attached to the post 183 and a stop 186 also carried by the arm 174. Maximum rotation of the cam 42 is limited by a post 187 carried thereby which engages the stop 186. In the latter position of the cam, the switch plungers 44 and 47 still contact their respective cam faces 43 and 46. A shield 188 is preferably carried by the blade shaft 180 to prevent possible freezing together of the sleeve 176, shaft 180 and the bushing of the structure 175.

Figure 15:
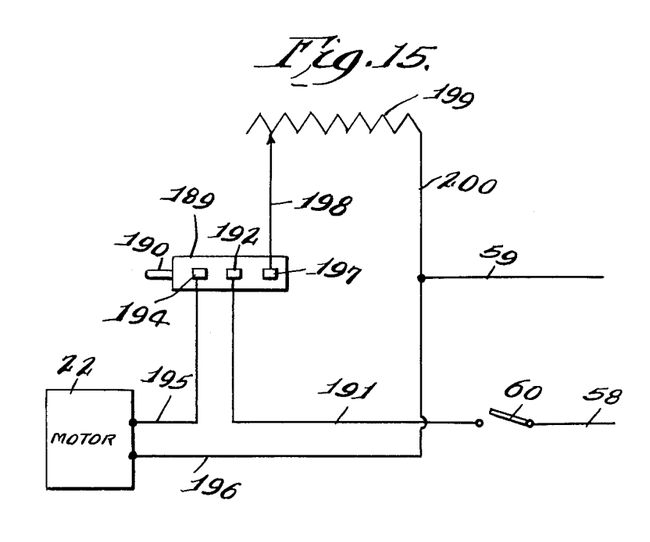
Figs. 15 and 16 are diagrammatic views showing a variant detail involving use of a double pole switch for alternatively closing the circuit through the motor and the heater coil in the Fig. 12 modification.
Figure 16:
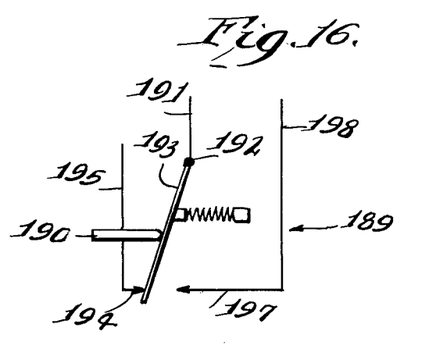

In Figs. 15 and 16 is illustrated a suggested modification of the Fig. 12 control which involves the substitution of a double throw switch 189 for the switch 48, the plunger 190 of the former switch being operably related to the cam face 46.

Referring to Fig. 15 which illustrates the circuit arrangement, the hot power wire 58 connects by a wire 191 with the intermediate switch terminal 192 and hence with the switch arm 193. One end contact 194 connects by a wire 195 with the motor 22 which in turn connects by wire 196 with the ground power wire 59, while the other end contact 197 connects by wire 198 with an adjustable heater 199, similar to the heater 97 (see Fig. 2), which in turn connects by wire 200 with the ground power wire 59.

When the switch 60 is closed, thus placing the control in readiness for a snow fall, the parts are in the several positions shown so that the circuit is completed through the motor 22. When sufficient snow mass has accumulated on the table 177 (see Fig. 12) to effect an actuation of the switch plunger 190 by the cam face 46, the switch arm 193 is moved to interrupt the circuit through the motor and complete the circuit through the heater 199.

This modification of the Fig. 12 control is precautionary in nature since it provides a limit switch on the operation of the motor and prevents possible shearing of the flexible shaft 179 when the post 187 engages the stop 186 (see Fig. 14).

Rainfall does not have any effect on any of the above controls in the sense of initiating operation thereof. In each case, a definite resistance, established by the collection of a snow mass, must exist between the table and blade before the relative movements thereof can place the control in full operation. The term "snow," as used in the specification and claims, is considered as including sleet and the terms "driveway," "pavement" and "roadway" include any surface which is kept free of snow by the control.

Figure 17:
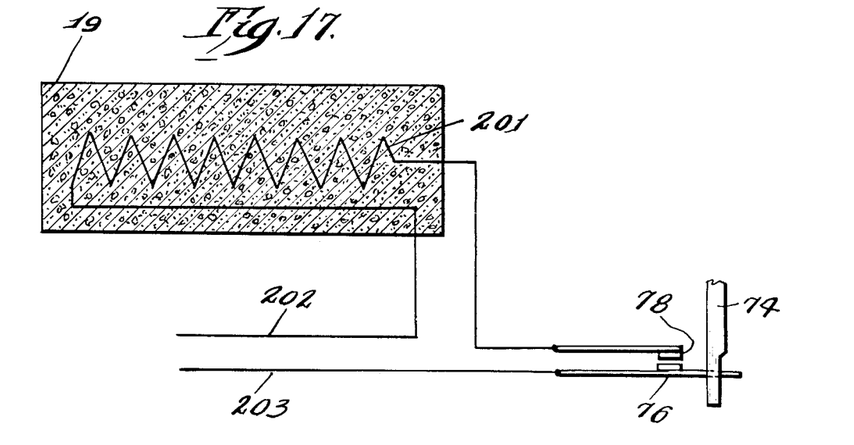
Figs. 17 and 18 are diagrammatic and fragmentary views showing, respectively, the utilization of an electric heating coil and steam pipes when embedded in the roadway.

In Fig. 17 is illustrated the utilization of the melting control in connection with an electric heating coil 201 embedded in the driveway 19 in the same functional relation thereto as the pipe circuit 18 in Fig. 1. By way of example, it will be assumed that this variation is employed with the control shown in Fig. 2 and accordingly common parts are identified by the same numerals. Therefore, the coil 201 is included in a circuit comprising the switch arm 76 and contact 78 and power wires 202 and 203.

When the insulation rod 74 is raised in the manner described for the Fig. 2 control, the switch arm 76 engages the contact 78 to thereby complete the circuit through the coil. The operation is otherwise identical with the Fig. 2 control.

Figure 18:
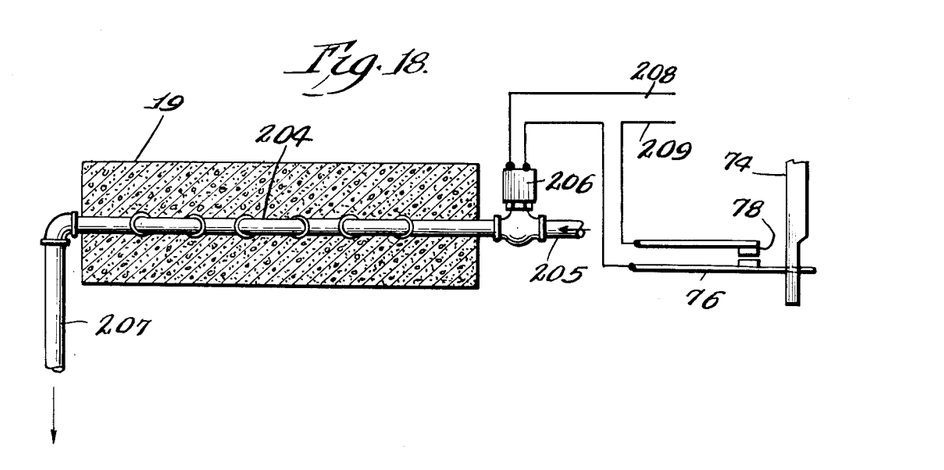

The Fig. 18 variation also employs, by way of example, the Fig. 2 control which is arranged to determine the flow of a steam supply to a panel pipe system 204 embedded in the driveway 19. Steam is fed to the system 204 through a supply pipe 205 connected to a suitable source (not shown) and which includes an electrically operated valve 206 of conventional type, such as a solenoid or motor operated valve. Discharge from the system 204 is conveyed through a pipe 207 to any desired location.

The electrical portion of the valve 206 is included in a circuit comprising power wires 208 and 209, the switch arm 76 and contact 78 so that when the insulation rod 74 is raised as already described, the switch arm 76 engages the contact 78 and completes the circuit to open the valve 206.

It will be understood that the pipe system 204 is deemed the equivalent of any duct system embedded in the driveway and such as might be used for hot gases. In general, therefore, any of the above controls may be employed to determine the operation of any type of heating unit that is positioned in heat exchange relation to any kind of surface that it is desired to keep free of snow.

I claim:

1. A control for determining the operation of a snow melting system comprising a pair of members exposed to snow fall, means for effecting a relative wiping movement of the members to collect a snow mass therebetween, means for conditioning one of the members for an independent movement due to pressure exerted by a predetermined snow mass, and means responsive to said one member independent movement for placing the snow melting system in operation.

2. A control for determining the operation of a snow melting system comprising a pair of members exposed to snow fall, means for effecting a relative wiping movement of the members to collect a snow mass therebetween, means for conditioning one of the members for an independent movement due to pressure exerted by a predetermined snow mass, an electric circuit including a switch closed by said one member independent movement and a relay, and switch means closed by the energization of the relay for placing the snow melting system in operation.

3. A control for determining the operation of a snow melting system comprising a pair of members exposed to snow fall, means for effecting a relative wiping movement of the members to collect a snow mass therebetween, means for conditioning one of the members for an independent movement due to pressure exerted by a predetermined snow mass, a first electric circuit including a switch closed by said one member independent movement and a relay, a second electric circuit including a switch closed by an additional independent movement of said member and a heater coil for establishing a melting rate for the snow mass approximately equal to the melting rate of the system, and switch means closed by the energization of the relay for placing the snow melting system in operation.

4. A control for determining the operation of a snow melting system comprising a pair of members exposed to snow fall, means for effecting a relative wiping movement of the members to collect a snow mass therebetween, means for conditioning one of the members for an independent movement due to pressure exerted by a predetermined snow mass, an electric circuit including a switch closed by said one member independent movement and a relay, a holding electric circuit including the relay, a first switch closed by the energization of the relay and a normally closed switch arranged for opening at predetermined intervals whereby the energization of the relay is maintained for a predetermined time beyond an opening of the first named switch, and switch means closed by the energization of the relay for placing the snow melting system in operation.

5. A control for determining the operation of a snow melting system comprising a pair of members exposed to snow fall, means for effecting a relative wiping movement of the members to collect a snow mass therebetween, means for conditioning one of the members for an independent movement due to pressure exerted by a predetermined snow mass, a first electric circuit including a switch closed by said one member independent movement and a relay, a second electric circuit including a switch closed by an additional independent movement of said one member and a heater coil for establishing a melting rate for the snow mass approximately equal to the melting rate of the system, a holding electric circuit including the relay, a first switch closed by the energization of the relay and a normally closed switch arranged for opening at predetermined intervals whereby the energization of the relay is maintained for a predetermined time beyond an opening of the first circuit switch, and switch means closed by the energization of the relay for placing the snow melting system in operation.

6. A control for determining the operation of a snow melting system comprising a rotatable, horizontal table exposed to snow fall, a pivoted blade located above the table for accumulating a snow mass thereon as the table rotates, and means responsive to a predetermined movement of the blade due to pressure exerted by the snow mass for placing the snow melting system in operation.

7. A control for determining the operation of a snow melting system comprising a rotatable, horizontal, disk table exposed to snow fall and including a plurality of ridges on the upper surface thereof, a pivoted blade located above the table for accumulating a snow mass thereon as the table rotates, and means responsive to a predetermined movement of the blade due to pressure exerted by the snow mass for placing the snow melting system in operation.

8. A control for determining the operation of a snow melting system comprising a rotatable, horizontal table exposed to snow fall, a pivoted blade located above the table for accumulating a snow mass thereon as the table rotates, an electric circuit including a relay and a switch responsive to and closed after a predetermined movement of the blade due to pressure exerted by the snow mass, and switch means closed by the energization of the relay for placing the snow melting system in operation.

9. A control for determining the operation of a snow melting system comprising a rotatable, horizontal table exposed to snow fall, a pivoted blade located above the table for accumulating a snow mass thereon as the table rotates, a first electric circuit including a relay and a switch responsive to and closed after a predetermined movement of the blade due to pressure exerted by the snow mass, a second electric circuit including a switch closed by a blade movement in excess of said predetermined movement and a heater coil for establishing a melting rate for the snow mass approximately equal to the melting rate of the system, and switch means closed by the energization of the relay for placing the snow melting system in operation.

10. A control for determining the operation of a snow melting system comprising a horizontal table exposed to snow fall, a motor for rotating the table at constant speed, a pivoted blade located above the table for accumulating a snow mass thereon as the table rotates, an electric circuit including a relay and a switch responsive to and closed after a predetermined movement of the blade due to pressure exerted by the snow mass, a cam driven by the motor, a holding circuit including the relay, a first switch closed by the energization of the relay and a second switch normally closed by the cam and opening at determined intervals, and switch means closed by the energization of the relay for placing the snow melting system in operation.

11. A control for determining the operation of a snow melting system comprising a rotatable, horizontal table exposed to snow fall, a pivoted blade located above the table for accumulating a snow mass thereon as the table rotates, a plurality of radial vanes carried by the table for oscillating the blade as the table rotates to thereby accelerate the accumulation of the snow mass, spring means biasing the blade into contact with the vanes, and means responsive to a predetermined movement of the blade due to pressure exerted by the snow mass for placing the snow melting system in operation.

12. A control for determining the operation of a snow melting system comprising a constant speed, rotating cam, a rock arm biased to ride on the cam and actuated thereby for a forward movement, a horizontal, snow collecting table carried by the rock arm and having an abutment wall and retaining side walls extending therefrom, a fixed blade for accumulating a snow mass on the table against the abutment wall during each forward movement of the table, means for conditioning the table for an independent movement opposite to the forward movement due to pressure exerted against the abutment wall by a predetermined snow mass, and means responsive to the independent movement of the table for placing the snow melting system in operation.

13. A control for determining the operation of a snow melting system comprising a constant speed, rotating cam, a rock arm biased to ride on the cam and actuated thereby for a forward movement, a spring arm connected at one end to the rock arm, a horizontal, snow collecting table carried by the other end of the spring arm and having an abutment wall and retaining side walls extending therefrom, a fixed blade for accumulating a snow mass on the table against the abutment wall during each forward movement of the table, the spring arm bowing in a direction opposite to the forward movement due to pressure exerted against the abutment wall by the snow mass, and means responsive to a predetermined bowing of the spring arm for placing the snow melting system in operation.

14. A control for determining the operation of a snow melting system comprising a constant speed, rotating cam, a rock arm biased to ride on the cam and actuated thereby for a forward movement, a spring arm connected at one end to the rock arm, a horizontal, snow collecting table carried by the other end of the spring arm and having an abutment wall and retaining side walls extending therefrom, a fixed blade for accumulating a snow mass on the table against the abutment wall during each forward movement of the table, the spring arm bowing in a direction opposite to the forward movement due to pressure exerted against the abutment wall by the snow mass, an electric circuit including a relay and a switch responsive to and closed after a predetermined bowing of the spring arm, and switch means closed by the energization of the relay for placing the snow melting system in operation.

15. A control for determining the operation of a snow melting system comprising a constant speed, rotating cam, a rock arm biased to ride on the cam and actuated thereby for a forward movement, a spring arm connected at one end to the rock arm, a horizontal, snow collecting table carried by the other end of the spring arm and having an abutment wall and retaining side walls extending therefrom, a fixed blade for accumulating a snow mass on the table against the abutment wall during each forward movement of the table, the spring arm bowing in a direction opposite to the forward movement due to pressure exerted against the abutment wall by the snow mass, an electric circuit including a switch responsive to and closed after a predetermined bowing of the spring arm and parallel branches each in series with the switch, one branch including a relay and the other branch including a heater coil positioned to apply heat to the table, and switch means closed by the energization of the relay for placing the snow melting system in operation.

16. A control for determining the operation of a snow melting system comprising a constant speed, rotating cam having a pair of oppositely disposed lobes and a pair of intervening dwell portions, each lobe and each dwell portion extending for approximately one quadrant of the cam, a rock arm biased to ride on the cam and actuated by the lobes for a forward movement twice during each revolution of the cam, a spring arm connected at one end to the rock arm, a horizontal, snow collecting table carried by the other end of the spring arm and having an abutment wall and retaining side walls extending therefrom, a fixed blade for accumulating a snow mass on the table against the abutment wall during each forward movement of the table, the spring arm bowing in a direction opposite to the forward movement due to pressure exerted against the abutment wall by the snow mass, a first circuit including a relay and a switch responsive to and closed after a predetermined bowing of the spring arm, a second and holding circuit including a first switch closed by the energization of the relay when the first circuit switch closes, a second switch closed for a quadrant period twice during each revolution of the cam, and the relay, the relation of the rock arm and the second switch of the holding circuit to the cam being such that when one cam lobe begins swinging the rock arm the other cam lobe is approaching the end of its contact with said second switch, and switch means closed by the energization of the relay for placing the snow melting system in operation.

17. A control for determining the operation of a motor driven pump for circulating heated fluid through a snow melting system comprising a rotatable, horizontal, paddle wheel having a plurality of circumferentially spaced blades, an upwardly concave table freely suspended beneath the wheel for receiving snow fall and over which the blades pass, each blade accumulating a snow mass on the table during each traverse thereof to thereby effect a swing movement of the table, and means responsive to a predetermined movement of the table for placing the snow melting system in operation.

18. A control for determining the operation of a snow melting system comprising a vertical power shaft, a vertical blade secured at one end to and extending substantially horizontally from the shaft, a freely and vertically journaled table beneath the blade and exposed to snow fall, the rotation of the blade accumulating a snow mass on the table whose pressure rotates the table, and means responsive to a predetermined movement of the table for placing the system in operation.

19. The combination of a snow melting, pipe system including a pump for circulating a heated fluid therethrough, a motor for driving the pump, and a control for starting the motor comprising a pair of members exposed to snow fall, means for effecting a relative wiping movement of the members to collect a snow mass therebetween, means for conditioning one of the members for an independent movement due to pressure exerted by a predetermined snow mass, and switch means in the motor circuit responsive to and closed by the independent movement of said one member.

20. A control for determining the operation of a snow melting system for a roadway comprising means embedded in the roadway for applying heat thereto, a pair of members exposed to snow fall, means for effecting a relative wiping movement of the members to collect a snow mass therebetween, means for conditioning one of the members for an independent movement due to pressure exerted by a predetermined snow mass, and means responsive to said one member independent movement for placing the heat applying means in operation.

21. A control for determining the operation of a snow melting system comprising a freely journaled, substantially horizontal table exposed to snow fall, a rotatable blade mounted above the table for accumulating a snow mass thereon as the blade rotates, and means responsive to a predetermined movement of the table due to pressure exerted by the snow mass for placing the system in operation.

22. A control for determining the operation of a snow melting system comprising a freely journaled, substantially horizontal table exposed to snow fall and including a plurality of ridges on the upper surface thereof, a rotatable blade mounted above the table for accumulating a snow mass thereon as the blade rotates, and means responsive to a predetermined movement of the table due to pressure exerted by the snow mass for placing the system in operation.

23. A control for determining the operation of a snow melting system comprising a freely journaled, substantially horizontal table exposed to snow fall, a rotatable blade mounted above the table for accumulating a snow mass thereon as the blade rotates, an electric circuit including a relay and a switch responsive to and closed after a predetermined movement of the table due to pressure exerted by the snow mass, and switch means closed by the energization of the relay for placing the system in operation.

24. A control for determining the operation of a snow melting system comprising a freely journaled, substantially horizontal table exposed to snow fall, a rotatable blade mounted above the table for accumulating a snow mass thereon as the blade rotates, a first electric circuit including a relay and a switch responsive to and closed after a predetermined movement of the table due to pressure exerted by the snow mass, a second electric circuit including a switch closed by a table movement in excess of said predetermined movement and a heater coil for establishing a melting rate for the snow mass approximately equal to the melting rate of the system, and switch means closed by the energization of the relay for placing the system in operation.

25. A control for determining the operation of a snow melting system comprising a freely journaled, substantially horizontal table exposed to snow fall, a rotatable blade mounted above the table for accumulating a snow mass thereon as the blade rotates, a motor for driving the blade at constant speed, an electric circuit including a relay and a switch responsive to and closed after a predetermined movement of the table due to pressure exerted by the snow mass, a cam driven by the motor, a holding circuit including the relay, a first switch closed by the energization of the relay and a second switch normally closed by the cam and opening at determined intervals whereby the energization of the relay is maintained for a predetermined time beyond an opening of the first named switch, and switch means closed by the energization of the relay for placing the system in operation.

26. A control for determining the operation of a snow melting system comprising a freely journaled, substantially horizontal table exposed to snow fall, a rotatable blade mounted above the table for accumulating a snow mass thereon as the blade rotates, a first electric circuit including a switch closed by said table movement and a relay, a second electric circuit including a switch closed by an additional table movement and a heater coil for establishing a melting rate for the snow mass approximately equal to the melting rate of the system, a holding electric circuit including the relay, a first switch closed by the energization of the relay and a normally closed switch arranged for opening at predetermined intervals whereby the energization of the relay is maintained for a predetermined time beyond an opening of the first circuit switch, and switch means closed by the energization of the relay for placing the system in operation.

References Cited in the file of this patent

UNITED STATES PATENTS

| 795,772 | Janney | July 25, 1905 |
| 2,126,238 | Whitson | Aug. 9, 1938 |
| 2,617,597 | Bonilla | Nov. 11, 1952 |

OTHER REFERENCES

"Radiant Heating" by T. Napier Adlam, pp. 321–327, copyright 1947 by The Industrial Press, New York 13, New York.